US012756346B2

(12) United States Patent
Gonthier et al.

(10) Patent No.: US 12,756,346 B2
(45) Date of Patent: Oct. 6, 2026

(54) CONTROL CIRCUIT OF A TRIAC OR A THYRISTOR

(71) Applicant: STMICROELECTRONICS INTERNATIONAL N.V., Geneva (CH)

(72) Inventors: Laurent Gonthier, Shenzhen (CN); Minjie Li, Shenzhen (CN)

(73) Assignee: STMICROELECTRONICS INTERNATIONAL N.V., Geneva (CH)

(*) Notice: Subject to any disclaimer, the term of this patent is extended or adjusted under 35 U.S.C. 154(b) by 260 days.

(21) Appl. No.: 18/622,199

(22) Filed: Mar. 29, 2024

(65) Prior Publication Data

US 2024/0348188 A1 Oct. 17, 2024

(30) Foreign Application Priority Data

Apr. 13, 2023 (EP) .................................... 23305555

(51) Int. Cl.
*H03K 17/60* (2006.01)
*H02P 23/26* (2016.01)
*H02P 27/06* (2006.01)

(52) U.S. Cl.
CPC .............. *H02P 27/06* (2013.01); *H02P 23/26* (2016.02)

(58) Field of Classification Search
CPC ...... H02P 27/06; H02P 23/26; H02M 1/4233; H02M 1/08; H02M 5/2573; H02M 1/06; H02M 1/088; H03K 17/72; H03K 17/602
See application file for complete search history.

(56) References Cited

U.S. PATENT DOCUMENTS 5,995,395 A 11/1999 Rivet
9,912,249 B2 * 3/2018 Benabdelaziz ..... H02M 7/1623
10,284,107 B2 * 5/2019 Gonthier ................. H02M 7/06
2016/0111969 A1 * 4/2016 Gonthier ............. H02M 7/1623 363/126
2019/0214985 A1 * 7/2019 Benabdelaziz ...... H03K 17/725
2023/0308008 A1 * 9/2023 Suzuki .................... H02M 1/08

OTHER PUBLICATIONS

A.C. Voltage Regulators, wireless Word, Thompson, pp. 339-344 (Year: 1973).*

* cited by examiner

*Primary Examiner* — Muhammad S Islam
(74) *Attorney, Agent, or Firm* — Alston & Bird LLP

(57) ABSTRACT

The present disclosure relates to a control circuit of a triac or thyristor having its driving reference terminal connected to a first reference node and coupled to a voltage rectifier comprising at least a semiconductor device connected between the first reference node and a second reference node of the control circuit comprising: a first bipolar transistor; and a driving circuit of the first transistor referenced to the second reference node.

15 Claims, 10 Drawing Sheets

(A)

(B)

CONTROL CIRCUIT OF A TRIAC OR A THYRISTOR

CROSS REFERENCE TO RELATED APPLICATIONS

This application claims the priority benefit of European patent application number EP23305555.7, filed on Apr. 13, 2023, entitled "Control Circuit of a Triac or a Thyristor," which is hereby incorporated by reference to the maximum extent allowable by law.

TECHNICAL FIELD

The present disclosure relates generally to electronical devices and circuits. The present disclosure relates more particularly to voltage converter circuit, and, more precisely, to voltage converter circuit comprising a triac of a thyristor.

BACKGROUND

Power conversion, and in particular the conversion of an AC voltage into another AC voltage or a DC voltage, is a technical field in constant evolution and constant growth.

It would be desirable to at least partly improve certain aspects of known voltage converter circuits, and in particular converter circuits comprising a triac or a thyristor.

BRIEF SUMMARY

There is a need for a more efficient control circuit of a triac.

There is a need for a more efficient control circuit of a thyristor.

There is a need for a more efficient converter circuit.

There is a need for a more efficient power supply circuit for a motor.

One embodiment addresses all or some of the drawbacks of known control circuit of a triac.

One embodiment addresses all or some of the drawbacks of known control circuit of a thyristor.

One embodiment addresses all or some of the drawbacks of known voltage converter circuit.

One embodiment addresses all or some of the drawbacks of known power supply circuit for a motor.

One embodiment provides a control circuit of a triac or thyristor having its driving reference terminal connected to a first reference node and coupled to a voltage rectifier comprising at least a semiconductor device connected between the first reference node and a second reference node of the control circuit comprising:

A first bipolar transistor;

A driving circuit of said first transistor referenced to the second reference node.

According to an embodiment, when the control circuit is a triac control circuit, said first transistor is a bipolar transistor of the NPN type.

According to an embodiment, when the control circuit is a thyristor control circuit, said first transistor is a bipolar transistor of the PNP type.

According to an embodiment, said semiconductor device is a first diode whose anode is connected to the first reference input node.

According to an embodiment, said semiconductor device is a MOS type transistor.

According to an embodiment, said semiconductor device is assembly comprising an IGBT type transistors connected in antiparallel with a diode or a reverse-conducting IGBT type transistor.

According to an embodiment, when the control circuit is a triac control circuit, the driving circuit comprises a Zener-type diode coupling the base of said bipolar transistor to a first conduction terminal of said transistor.

According to an embodiment, the circuit being a control circuit of two triacs or one thyristor and one triac.

According to an embodiment, the circuit being configured to be controlled by a processor.

Another embodiment provides a converter of a first AC voltage into a second voltage comprising at least a triac or a thyristor and at least one control circuit according to any of claims 1 to 9 of said triac or thyristor.

According to an embodiment, the converter further comprises a voltage rectifier assembly.

According to an embodiment, said assembly comprises a first input node and a second reference input node, between which an AC voltage is applied.

According to an embodiment, the converter further comprises a power factor correction circuit.

Another embodiment provides a supply circuit of a motor supplying a three-phase voltage comprising a converter described before.

According to an embodiment, the supply circuit further comprises a processor configured to drive said control circuit.

BRIEF DESCRIPTION OF DRAWINGS

The foregoing features and advantages, as well as others, will be described in detail in the following description of specific embodiments given by way of illustration and not limitation with reference to the accompanying drawings, wherein.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In FIGS. 2, 3, 5, 7 and 8, polarity of coils are represented by a black point.

Figure 1:
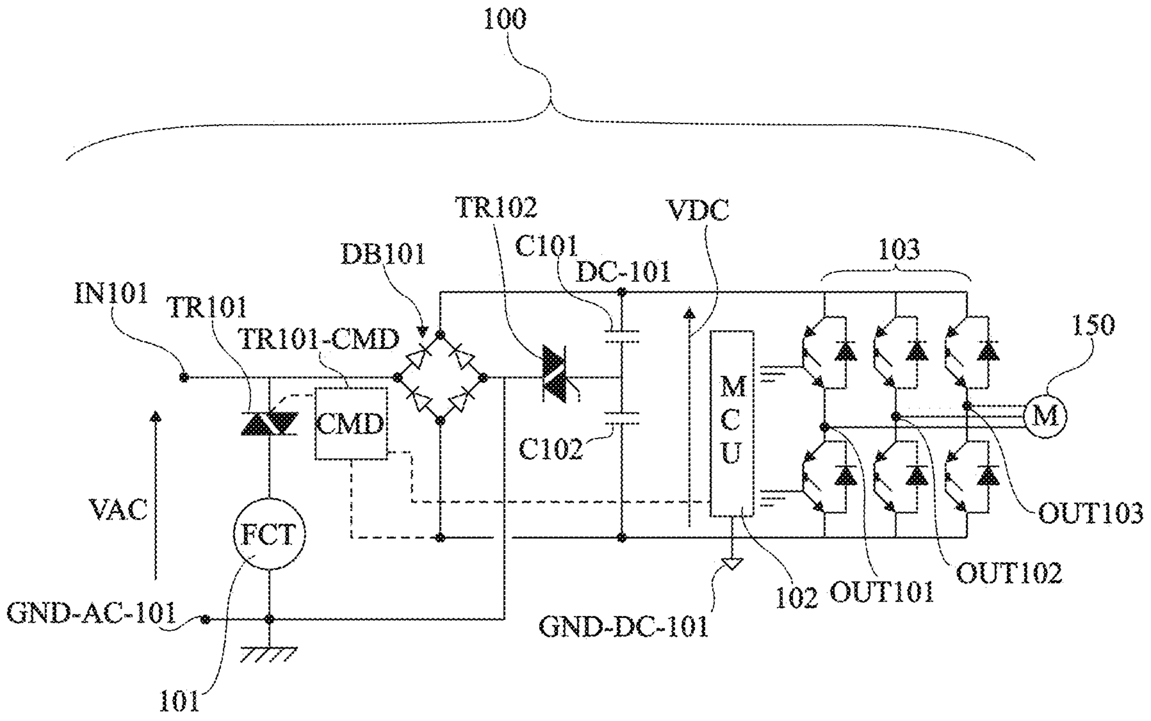
FIG. 1 illustrates, very schematically and partially in form of blocs, an embodiment of a power supply circuit for a motor and such a motor.

FIG. 1 shows, very schematically and partially in the form of blocks, a circuit 100.

According to an example, circuit 100 is a simplified example of a power supply circuit for a motor 150, depicted in FIG. 1, configured to be powered by said circuit.

The power supply circuit 100 is configured to supply a three-phase power supply to the motor 150 from an AC voltage VAC. For this, the power supply circuit 100 comprises a first conversion stage that converts the AC voltage VAC into a direct voltage VDC, this voltage VDC is then converted, by a second conversion stage, into three sinusoidal voltages of identical amplitude and phase shifted with respect to each other. These three voltages are used to power motor 150. The following description only concerns embodiments of the first conversion stage of a power supply circuit, such as a power supply of the type of power supply circuit 100, the second conversion stage will not be detailed. The first conversion stage is hereafter called converter circuit of the power supply circuit 100.

The power supply circuit 100 comprises two input nodes IN101 and GND-AC-101 receiving the AC voltage AC, and three output nodes OUT101, OUT102 and OUT103 supplying the sinusoidal voltages to the motor 150.

The power supply circuit 100, and more particularly its converter circuit, further comprises a triac TR101 and a component 101 (FCT) configured to receive an AC supply voltage. Triac TR101 and component 101 are connected in series between input nodes IN101 and GND-AC-101. Several assemblies of this type, that is to say comprising a triac and a component configured to receive an alternating supply voltage, can be arranged in parallel between the nodes IN101 and GND-AC-101. According to one embodiment, the triac TR101 may be replaced by a thyristor.

The converter circuit further comprises a voltage rectifier assembly, or voltage rectifier circuit, or rectifier, suitable for converting the AC voltage VAC into the DC voltage VDC. The rectifier comprises a diode bridge DB101 described in detail in relation to the following figures, for example, a triac TR102, and, for example, two capacitors C101 and C102.

The diode bridge comprises two input nodes, a first being connected, preferably connected, to the input node IN101, and a second being connected, preferably connected, to the input node GND-AC-101. The diode bridge further comprises two output nodes DC-101 and GND-DC-101 whose potential difference corresponds to the DC voltage VDC. A first output node of the diode bridge is connected, preferably connected, to node DC-101. A second output node of the diode bridge is coupled, preferably connected, to node GND-DC-101.

Capacitors C101 and C102 are arranged in series between nodes DC-101 and GND-DC-101. According to one example, capacitors C101 and C102 are filter transistors. Triac TR102 is placed between node GND-AC-101 and the middle node between capacitors C101 and C102. According to a variant, circuit 100 does not comprise triac TR102. According to a variant, circuit 100 comprises only capacitor C101 or only capacitor C102.

Circuit 100 further comprises a processor 102 (MCU) suitable for controlling circuit 100. According to one example, processor 102 is a microprocessor.

According to an example, the converter circuit may further comprise a power factor correction circuit.

According to an example, the power supply circuit 100 may further comprises an assembly 103 supplying the three-phase supply voltages to the motor 150. This assembly is, for example, composed of several transistors coupled to diodes. This assembly comprises as input nodes the nodes DC-101 and GND-DC-101, and as output nodes the nodes OUT101, OUT102 and OUT103. According to a variant, circuit 100 does not comprise circuit 103.

The circuit 100, and more particularly its converter circuit, further comprises a control circuit TR101-CMD of the triac TR101, or, where appropriate, of a thyristor. The control circuit TR101-CMD is configured to supply a control current to the gate of the triac TR101. The control circuit TR101-CMD is itself controlled by the processor 102 which is referenced to the node GND-DC-101 forming the reference node of the direct voltage VDC. Embodiments of a triac control circuit are described in relation to FIGS. 2 to 7. An embodiment of a thyristor control circuit is described in relation to FIG. 8.

According to an embodiment, AC voltage VAC is a three phase voltage. In that case the neutral could be preferably referenced to node IN202. The adaptation of all embodiments described in relation with FIGS. 2 to 11 to a three phase VAC voltage as inputs is accessible for the person skilled in the art. In case the AC voltage source is provided by a 3-phase grid, comprising a neutral connection or not, nodes IN201 and IN202 could be any of these three phases and neutral point of this grid network.

Figure 2:
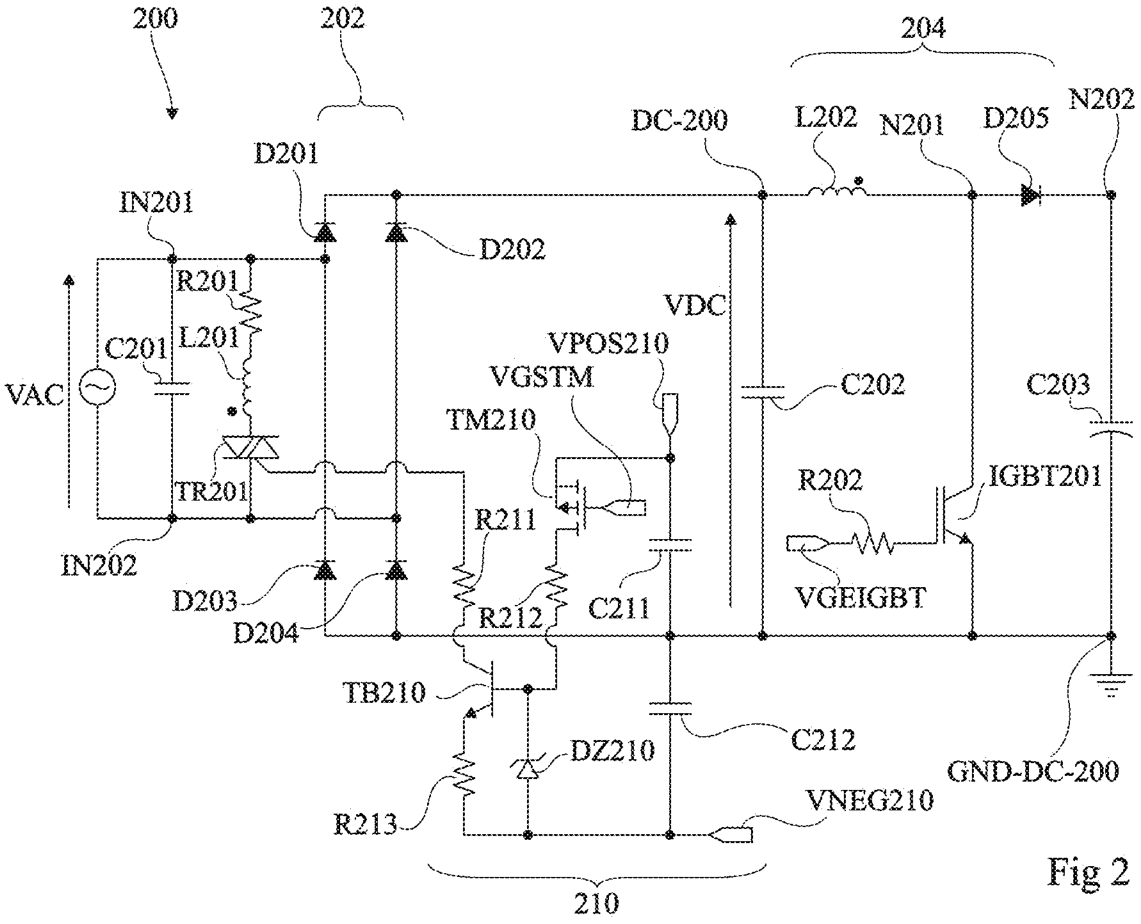
FIG. 2 illustrates a first embodiment of a voltage converter circuit comprising a first embodiment of a control circuit of a triac.

FIG. 2 represents a circuit 200 corresponding to part of an embodiment of a circuit similar to circuit 100 described in relation with FIG. 1.

According to an example, circuit 200 corresponds to part of an embodiment of the first conversion stage of a power supply circuit, for example, of the type of the power supply circuit 100 described in relation with FIG. 1. Circuit 200 comprises a first embodiment of a control circuit of a triac of the type of control circuit TR101-CMD described in relation to FIG. 1. More particularly, circuit 200 corresponds to a part of a first conversion stage of the power supply circuit, meaning said converter circuit.

Part 200 of the power supply circuit, or power supply circuit 200, comprises two input nodes IN201 and IN202 between which the AC voltage VAC is applied. In FIG. 2, an AC voltage source is shown between nodes IN201 and IN202.

The power supply circuit comprises, between the nodes IN201 and IN203 a triac TR201. The internal resistor of the component associated with triac TR201, of the type of the component 101 of FIG. 1, is represented as a resistor R201 arranged in series with triac TR201. The internal coil of said component associated with triac TR201 is represented as a coil L201 arranged in series with triac TR201. Resistor R201 and coil L201 represent the simplified electrical model of the triac load, meaning the component associated with triac TR201. A first terminal of the triac TR201 opposite the gate terminal of the triac TR201, usually called Anode 2 of triac TR201 is coupled, preferably connected, to one of the two nodes of the AC voltage source, for example it is considered here node IN201. A second terminal of the triac TR201, usually called Anode 1 or Cathode, or called driving reference terminal, referenced to its gate terminal, is coupled, preferably connected, to the node IN202. The gate terminal of the triac TR201 receives a control current supplied by a control circuit 210 described below.

Circuit 200 additionally and optionally comprises a filter capacitor C201 arranged between nodes IN201 and IN202.

Circuit 200 further comprises a voltage rectifier circuit 202, or rectifier 202, comprising two input nodes receiving the voltage VAC and two output nodes supplying a direct voltage VDC. More particularly, a first input node of rectifier 202 is coupled, preferably connected, to node IN201, and a second input node of rectifier 202 is coupled, preferably connected, to node IN202. A first output node of rectifier 202 is coupled, preferably connected, to a node DC-200, and a second output node of rectifier 202 is coupled, preferably connected, to node GND-DC-200.

According to one example, rectifier 202 is a diode bridge composed of four diodes D201, D202, D203 and D204. According to one example, the anode of diode D201 is coupled, preferably connected to node IN201, and the cathode of diode D201 is coupled, preferably connected, to node DC-200. According to one example, the anode of diode D202 is coupled, preferably connected to node IN202, and the cathode of diode D201 is coupled, preferably connected, to node DC-200. According to one example, the anode of diode D203 is coupled, preferably connected to node GND-DC-200, and the cathode of diode D203 is coupled, preferably connected, to node IN201. According to one example, the anode of diode D204 is coupled, preferably connected to node GND-DC-200, and the cathode of diode D204 is coupled, preferably connected, to node IN202.

Figure 5:
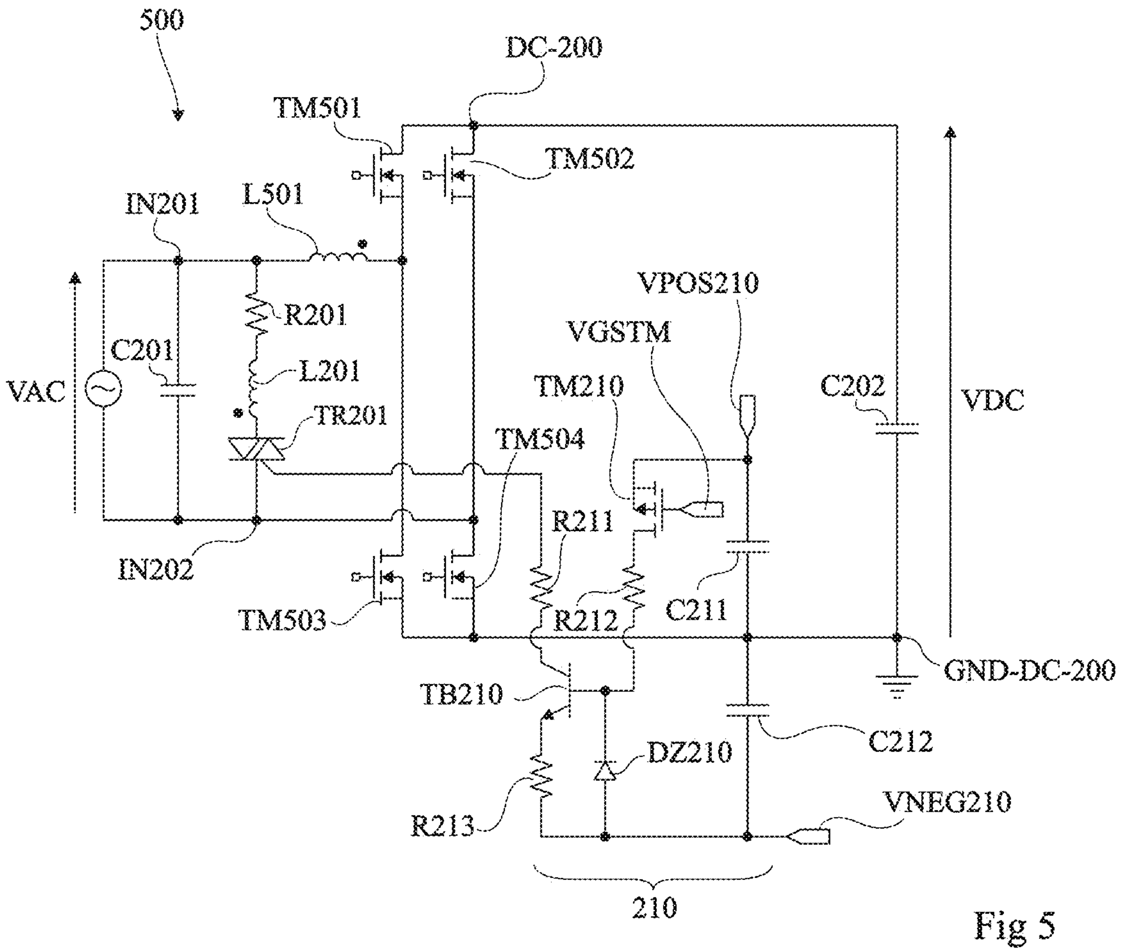
FIG. 5 illustrates a second embodiment of a voltage converter circuit of the power supply circuit of FIG. 1, comprising the first embodiment of a control circuit of a triac of FIG. 2.
Figure 6:
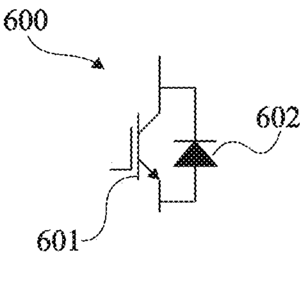
FIG. 6 illustrates, very schematically, an electronical component used for executing a third embodiment of a voltage converter circuit.

Other examples of rectifier 202 are described in relation with FIGS. 5 and 6.

Circuit 200 additionally and optionally includes a filter capacitor C202 disposed between nodes DC-200 and GND-DC-200.

The circuit 200 additionally and optionally comprises a circuit 204 for power factor correction (PFC) comprising a coil L202, a diode D205, an IGBT201 transistor, and, according to one example, an R202 resistor. The IGBT201 transistor is an insulated-gate bipolar transistor (IGBT, Insulated-Gate Bipolar Transistor), or IGBT transistor. The transistor IGBT201 is, more particularly, an NPN type IGBT transistor.

According to an example, a first terminal of the coil L202 is coupled, preferably connected, to the node DC-200, and a second terminal of the coil L202 is coupled, preferably connected to a node N201. According to one example, the anode of diode D205 is coupled, preferably connected, to node N201, and the cathode of diode D205 is coupled, preferably connected, to node N202. The collector of transistor IGBT201 is coupled, preferably connected, to node N201, and the emitter of transistor IGBT201 is coupled, preferably connected, to node GND-DC-200. The base of transistor IGBT201 is connected, via resistor R202, to a node supplying a control potential VGEIGBT. According to one example, the potential VGEIGBT is supplied directly or non-directly by a processor, or microprocessor, of the type of processor 102 described in relation to FIG. 1.

Circuit may generally comprise a capacitor C203 arranged between nodes N202 and GND-DC-200.

The circuit 200 further comprises the control circuit 210 of the triac TR201. Control circuit 210 comprises a bipolar transistor TB210 and its driving circuit.

Bipolar transistor TB210 comprises a collector terminal coupled to the gate of triac TR201, for example via a resistor R211. Bipolar transistor TB210 has its base terminal and emitter terminal coupled to its driving circuit. According to an embodiment, bipolar transistor TB210 is of NPN type.

According to an embodiment, the driving circuit of the bipolar transistor TB210 is referenced to the potential of node GND-DC-200 and comprises a transistor TM210 controlled by a command potential VGSTM. The driving circuit is, also, controlled by command potential supplied by a processor, or microprocessor, of the type of processor 102 described in relation to FIG. 1.

The driving circuit comprises a resistor R212 and the MOS transistor TM210. A MOS transistor is a metal-oxide-semiconductor field-effect transistor (MOSFET, MOS-FET, or MOS FET). According to an example MOS transistor TM210 is of P-type. A first terminal of resistor R212 is coupled, preferably connected, to the base terminal of transistor TB210, and a second terminal of resistor R212 is coupled, preferably connected, to a drain terminal of transistor TM210. A source terminal of transistor TM210 is coupled, preferably connected, to a node providing positive potential VPOS210. A source terminal of transistor TM210 is coupled, preferably connected, to a node providing a command potential VGSTM. For example, potentials VGSTM and VPOS210 are provided by a circuit embedding a processor, or microprocessor, of the type of processor 102 described in relation to FIG. 1.

The driving circuit comprises a resistor R213 and a Zener diode DZ210. A first terminal of resistor R213 is coupled, preferably connected, to an emitter terminal of transistor TB210, and a second terminal or resistor R213 is coupled, preferably connected, to a node providing a negative potential VNEG210. A cathode terminal of Zener diode DZ210 is coupled, preferably connected, to the base terminal of transistor TB210, and an anode terminal of Zener diode DZ210 is coupled, preferably connected, to the node providing potential VNEG210. For example, potential VNEG210 is supplied by an auxiliary power circuit not represented on the figures.

The supply circuit of the driving circuit comprises two capacitors C211 et C212. A first terminal of capacitor C211 is coupled, preferably connected, to the node providing potential VPOS210, and a second node of capacitor C212 is coupled, preferably connected, to node GND-DC-200. A first terminal of capacitor C211 is coupled, preferably connected, to the node providing potential VNEG210, and a second node of capacitor C212 is coupled, preferably connected, to node GND-DC-200.

Figure 3:
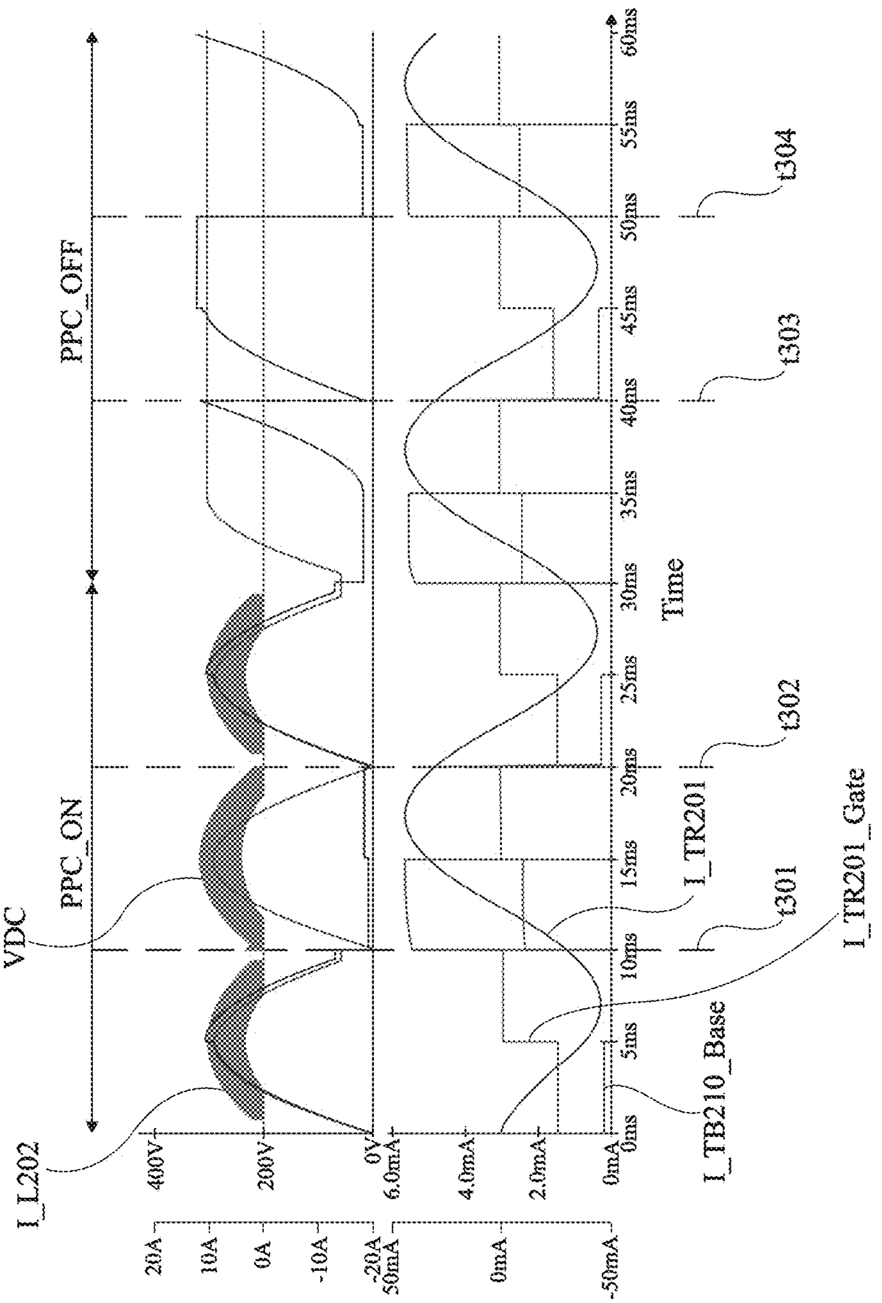
FIG. 3 illustrates curves describing normal operation of the control circuit of FIG. 2.
Figure 4:
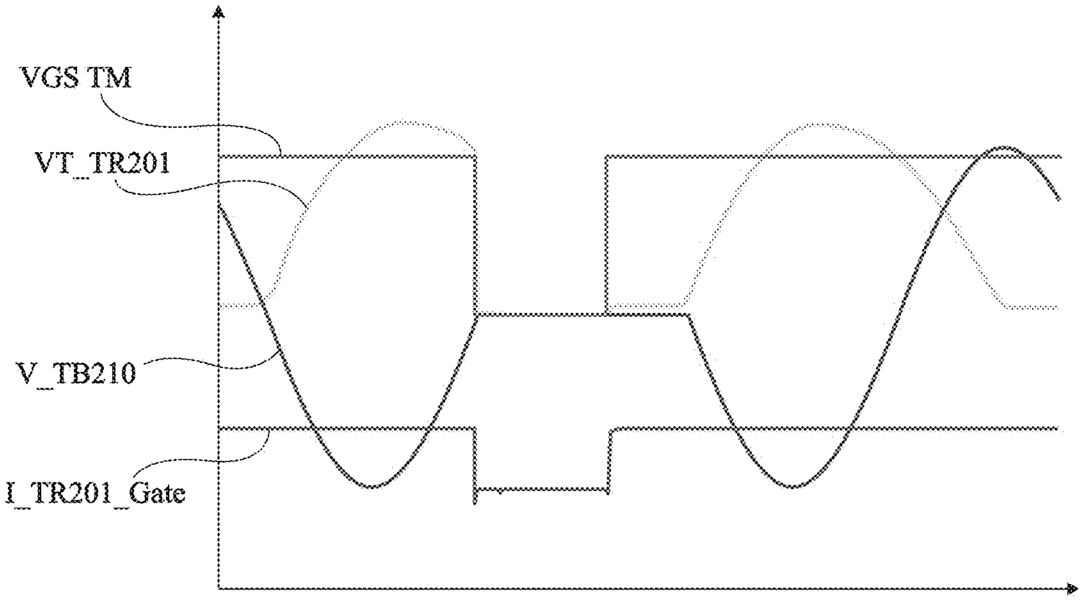
FIG. 4 illustrates other curves describing normal operation of the control circuit of FIG. 2.
Figure 4:
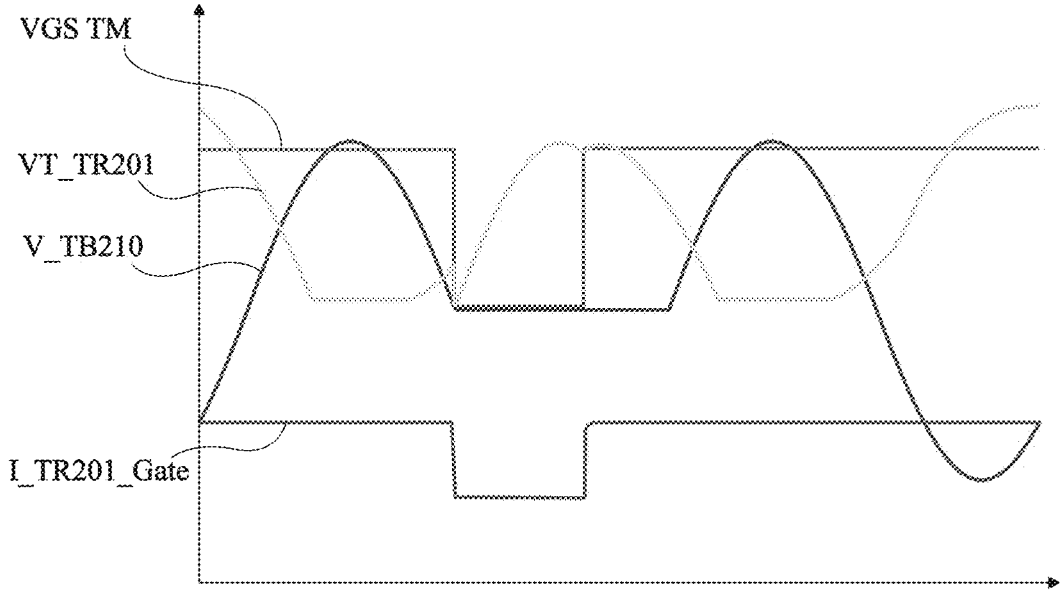

The operation of circuit 200 is described in relation to FIGS. 3 and 4.

FIG. 3 shows curves illustrating two normal operations PFC-ON and PFC-OFF of the circuit 200 described in relation with FIG. 2.

More particularly, FIG. 3 shows:

a curve IL202 showing a time variation of the current across the coil L202 of circuit 200, its color is green in FIG. 3;

a curve V_TB210 showing a time variation of the voltage flowing through the transistor TB210 of control circuit 210, its color is blue in FIG. 3;

a curve VDC showing a time variation of the voltage VDC of circuit 200, its color is red in FIG. 3;

a curve I_TB210-Base showing a time variation of the current flowing through the base terminal of transistor TB210 of control circuit 210, its color is red in FIG. 3;

a curve I_TR201_Gate showing a time variation of the current flowing through the gate terminal of triac TR201 of circuit 200, its color is green in FIG. 3; and a curve I_TR201 showing a time variation of the current flowing through the triac TR201 of circuit 200, meaning the current flowing between the first and second terminals of triac TR201, its color is blue in FIG. 3.

During the normal operation PFC_ON, the power factor corrector circuit 2074 is activated. In other words, the command potential VGEIGBT is supplied to the IGBT transistor IGBT201, for example, thanks to a processor of the type of processor 102 of FIG. 1.

At a time t301, the AC voltage VAC is positive, and the diode D201 and D204 can conduct. Transistor TB210 is forward-biased, and a positive command current (curve I_TR201_Base) is sourced to its base terminal. Thus, transistor TB210 is conductive, and a current (curve I_TR201_Gate) is sunk from the gate of triac TR201.

At a time t302, the AC voltage VAC is negative, and the diode D202 and D203 can conduct. Transistor TB210 is forward-biased and a positive command current (curve I_TR201_Base) is sourced to its base terminal. Thus, transistor TB210 is conductive. The current of its collector terminal increases with the AC voltage VAC. However, the voltage across resistor R213 is limited by the Zener Diode DZ210, and the voltage between the base terminal and the emitter terminal of transistor TB210, in consequence the current of the base terminal of transistor TB210 is reduced in order to keep constant the current of the collector terminal. Thus, Resistor R213 and transistor TB210 operates as a current source. Thus, a limited current (curve I_TR201_Gate) is supplied to the gate of triac TR201.

During the normal operation PFC_OFF, the power factor corrector circuit 2074 is deactivated. In other words, the command potential VGEIGBT is not supplied to the gate of IGBT transistor IGBT201. It does not impact the working of the control circuit 210.

Thus, at a time t303, the AC voltage VAC is positive, and the diode D201 and D204 can conduct. Transistor TB210 is forward-biased, and a positive command current (curve I_TR201_Base) is sourced to its base terminal. Thus, transistor TB210 is conductive, and a current (curve I_TR201_Gate) is sunk from the gate of triac TR201.

At a time t304, the AC voltage VAC is negative, and the diode D202 and D203 can conduct, and diode D203 is blocked. Transistor TB210 is forward-biased and a positive command current (curve I_TR201_Base) is sourced to its base terminal. Thus, transistor TB210 is conductive. The current of its collector terminal increases with the AC voltage VAC. However, the voltage across resistor R213 is limited by the Zener Diode DZ210, and the voltage between the base terminal and the emitter terminal of transistor TB210, in consequence the current of the base terminal of transistor TB210 is reduced in order to keep constant the current of the collector terminal. Thus, Resistor R213 and transistor TB210 operates as a current source. Thus, a limited current (curve I_TR201_Gate) is supplied to the gate of triac TR201.

FIG. 4 shows other curves illustrating a normal operations of the circuit 200 described in relation with FIG. 2. More particularly, FIG. 4 comprises two graphs (A) and (B) comprising the same curves. Graph (A) illustrates the case where AC voltage VAC is positive, and graph (b) illustrates the case where AC voltage VAC is negative.

More particularly, each graphs (A) and (B) shows:

a curve VGSTM showing a time variation of the command potential VGSTM of transistor TM210 of control circuit 210, its color is blue in FIG. 4;

a curve VT_TR201 showing a time variation of the voltage across the triac TR201 of control circuit 210, its color is red in FIG. 4;

a curve V_TB210 showing a time variation the voltage across the transistor TB210 of control circuit 210, its color is yellow in FIG. 4;

a curve I_TR201_Gate showing a time variation of the current flowing through the gate terminal of triac TR201 of circuit 200, its color is green in FIG. 4.

These two graphs shows that, when the AC voltage VAC is positive, the current of the gate terminal of triac TR201 is supplied by the negative potential VNEG210 referenced to GND-DC-200, and, when the AC voltage VAC is negative, the current of the gate terminal of triac TR201 is supplied by the sum of the AC voltage VAC itself and the negative potential VNEG210 referenced to GND-DC-200.

FIG. 5 represents a circuit 500 corresponding to part of an embodiment of circuit 100 described in relation with FIG. 1.

According to an embodiment, circuit 500 corresponds to part of an embodiment of a power supply circuit, of the type of the power supply circuit 100 described in relation with FIG. 1. Circuit 500 comprises a first embodiment of a control circuit of a triac of FIG. 2. Circuit 500 corresponds to a part of the first conversion stage of the power supply circuit, meaning said converter circuit.

More particularly, circuit 500 is a variant of circuit 200 described in relation with FIG. 2. Common elements of circuits 200 and 500 are not described in detail again here, and only differences between circuits 200 and 500 are emphasized.

More precisely, similarly to circuit 200, circuit 500 comprises:

triac TR201 and its control circuit 210;

capacitor C201; and capacitor C202.

According to an embodiment, circuit 500 may comprise the power factor correction circuit 204. Such circuit 204 is not represented in FIG. 5. According to a variant, a power factor correction function can be ensured by a coil coupled to transistors TM501 and TM504 described hereafter.

Instead of the diode bridge 202 of circuit 200, circuit 205 comprises a voltage rectifier circuit 501 comprising four MOS transistors TM501, TM502, TM503, and TM504. According to a first example, transistor TM501 to TM504 may be MOS transistor of N-type. According to a variant, transistors TM501 to TM504 can be IGBT transistors that are reverse-conducting.

According to one example, the source of transistor TM501 is coupled to node IN201, and the drain of transistor TM501 is coupled, preferably connected, to node DC-200. According to one example, the source of transistor TM502 is coupled, preferably connected, to node IN202, and the drain of transistor TM501 is coupled, preferably connected, to node DC-200. According to one example, the source of transistor TM503 is coupled, preferably connected, to node GND-DC-200, and the drain of transistor TM503 is coupled to node IN201. According to one example, the source of transistor TM504 is coupled, preferably connected to node GND-DC-200, and the drain of transistor TM504 is coupled, preferably connected, to node IN202.

According to an example, transistors TM501 to TM504 can receive directly, or through a coupling circuit, a command potential or a command signal from a processor of the type of processor 102 described in relation with FIG. 1.

According to an example, circuit 500 further comprises a coil L501 having a first terminal coupled, preferably connected, to node IN201, and having a second terminal coupled, preferably connected, to the source of transistor TM501 and to the drain of transistor TM503.

Circuit 500 operates in a similar way as circuit 200.

FIG. 6 represents an electronical component 600, or assembly 600, used for executing a part of an embodiment of circuit 100 described in relation with FIG. 1.

More particularly, four electronical components 600 can be used, in replacement of diodes D201 to D204 in circuit 200 or in replacement of transistor TM501 to TM504 of circuit 500, to form a voltage rectifier circuit.

Electronical component 600 comprises an IGBT transistor coupled in antiparallel with a diode 602. According to an embodiment, the IBGT transistor 601 is of NPN type. The collector terminal of transistor 601 is coupled, preferably connected, to the cathode of the diode 602. The emitter terminal of transistor 601 is coupled, preferably connected, to the anode of the diode 602.

According to a variant, electronical component 600 comprises an IGBT reverse-conducting transistor coupled.

A circuit of the type of circuits 200 and 500 using a voltage rectifier circuit comprising four components 600 operates in the same way as circuits 200 and 500.

Figure 7:
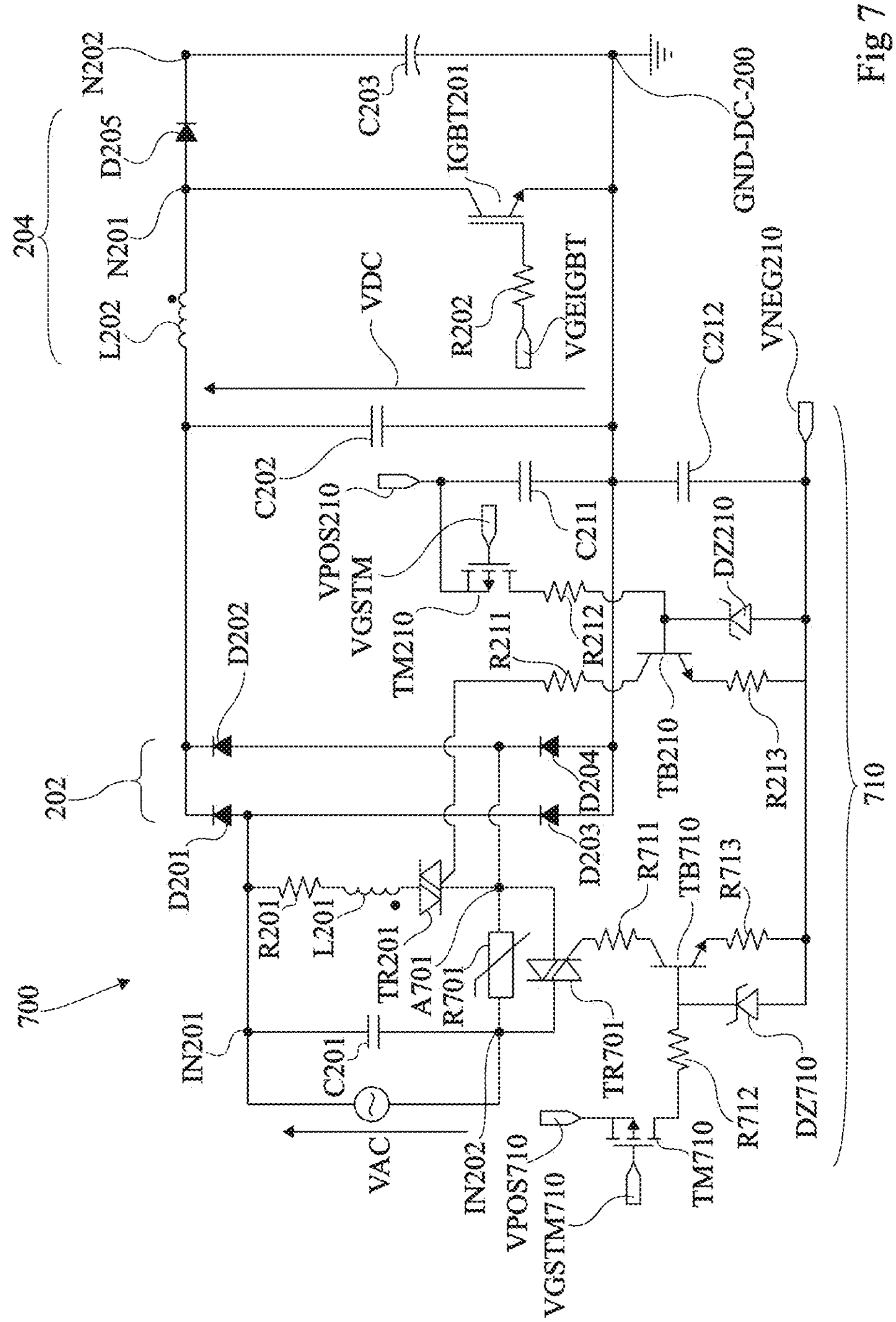
FIG. 7 illustrates a fourth embodiment of a voltage converter circuit of the power supply circuit of FIG. 1, comprising a second embodiment of a control circuit of a triac.

FIG. 7 represents a circuit 700 corresponding to part of an embodiment of a circuit similar to circuit 100 described in relation with FIG. 1.

According to an example, circuit 700 corresponds to part of an embodiment of a power supply circuit, of the type of the power supply circuit 100 described in relation with FIG. 1. Circuit 700 comprises a first embodiment of a control circuit of a triac of the type of control circuit TR101-CMD described in relation to FIG. 1. Circuit 700 corresponds to a part of the first conversion stage of the power supply circuit, meaning said converter circuit.

More particularly, circuit 700 is a variant of circuit 200 described in relation with FIG. 2. Common elements of circuits 200 and 700 are not described in detail again here, and only differences between circuits 200 and 700 are emphasized.

More precisely, similarly to circuit 200, circuit 700 comprises:

triac TR201;

capacitor C201;

voltage rectifier circuit 202;

capacitor C202; and power factor correction 204.

Circuit 700 further comprises another triac TR701 and an optional variable resistor R701 coupled in parallel. More particularly, a first terminal of variable resistor R701 is coupled, preferably connected, to input node IN202 and a second terminal of variable resistor R701 is coupled, preferably connected, to a node A701. Similarly, a first terminal of triac TR701, opposite to its gate terminal, is coupled, preferably connected, to input node IN202 and a second terminal triac TR701, near to its gate terminal, is coupled, preferably connected, to a node A701. Node A701 corresponds to the second terminal of triac TR201, near to its gate terminal, and to the second input node of the circuit 202.

Circuit 700 further comprises a common control circuit 710 for triac TR201 and triac TR701. Control circuit 710 comprises circuit 210 of circuit 200 described in relation with FIG. 2. More particularly, circuit 710 comprises:

bipolar transistor TB210;

resistors R211, R212, R213;

Zener diode DZ210;

MOS transistor TM210; and capacitors C211 and C212.

These electronical components are used to provided a command current to triac TR201.

Control circuit 710 further comprises a bipolar transistor TB710 and its driving circuit. According to an example, bipolar transistor TB710 is of NPN type.

Bipolar transistor TB710 comprises a collector terminal coupled to the gate of triac TR701, for example via a resistor R711. Bipolar transistor TB710 has its base terminal and emitter terminal coupled to its driving circuit.

According to an embodiment, the driving circuit of the bipolar transistor TB710 is referenced to the potential of node GND-DC-200 via capacitor C212. The driving circuit is, also, controlled by a command potential VGSTM710 detailed hereafter.

The driving circuit comprises a resistor R712 and a MOS transistor TM710. According to an example MOS transistor TM710 is of P-type. A first terminal of resistor R712 is coupled, preferably connected, to the base terminal of transistor TB710, and a second terminal of resistor R712 is coupled, preferably connected, to a drain terminal of transistor TM710. A source terminal of transistor TM210 is coupled, preferably connected, to a node providing a positive potential VPOS710, for example equal to potential VPOS210. A source terminal of transistor TM710 is coupled, preferably connected, to a node providing the command potential VGSTM710. For example, potentials VGSTM710 and VPOS710 are supplied by a processor, or microprocessor, of the type of processor 102 described in relation to FIG. 1.

The driving circuit further comprises a resistor R713 and a Zener diode DZ710. A first terminal of resistor R713 is coupled, preferably connected, to an emitter terminal of transistor TB710, and a second terminal or resistor R713 is coupled, preferably connected, to the node providing the negative potential VNEG210. A cathode terminal of Zener diode DZ710 is coupled, preferably connected, to the base terminal of transistor TB710, and an anode terminal of Zener diode DZ710 is coupled, preferably connected, to the node providing potential VNEG210.

Circuit 700 operates in a similar way as circuit 200.

Figure 8:
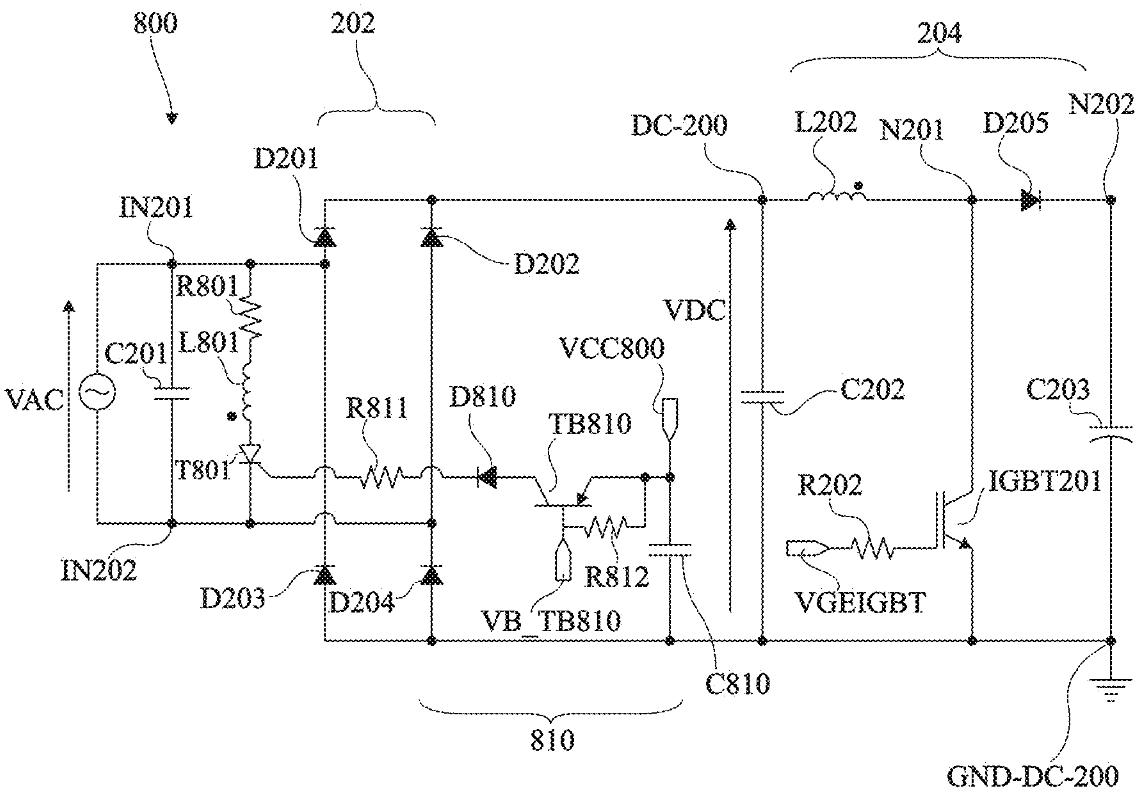
FIG. 8 illustrates a fifth embodiment of a voltage converter circuit of the power supply circuit of FIG. 1, comprising an embodiment of a control circuit of a thyristor.

FIG. 8 represents a circuit 800 corresponding to part of an embodiment of a circuit similar to circuit 100 described in relation with FIG. 1.

According to an example, circuit 800 corresponds to part of an embodiment of a power supply circuit, of the type of the power supply circuit 100 described in relation with FIG. 1. Circuit 800 comprises an embodiment of a control circuit of a thyristor. Circuit 800 corresponds to a part of the first conversion stage of the power supply circuit, meaning said converter circuit.

More particularly, circuit 800 is a variant of circuit 200 described in relation with FIG. 2. Common elements of circuits 200 and 800 are not described in detail again here, and only differences between circuits 200 and 800 are emphasized.

The main difference between circuits 200 and 800 is that circuit 800 does not comprise triac TR201 and its control circuit 210, but instead comprises a thyristor T801 and an associated control circuit 810. Thyristor T801 is coupled is a similar way as triac TR201. More precisely, a first terminal of thyristor T801, opposite to its gate terminal, is coupled, to input node IN201, and a second terminal of thyristor T801, near to its gate terminal, or called its driving reference terminal, is coupled, preferably connected, to the input node IN202. Moreover, the internal resistor of the component associated with thyristor T801, of the type of component 100 of FIG. 1, is represented as a resistor R801 arranged in series with thyristor T801. The internal coil of said component associated with thyristor T801 is represented as a coil L801 arranged in series with thyristor T801. Resistor R801 and coil L801 represent the simplified electrical model of the thyristor load, meaning the component associated with thyristor T801.

Thus, similarly to circuit 200, circuit 800 comprises:

capacitor C201;

voltage rectifier circuit 202;

capacitor C202; and power factor correction 204.

Control circuit 810 comprises a bipolar transistor TB810 and its driving circuit. According to an example, bipolar transistor TB810 is of PNP type.

Bipolar transistor TB710 comprises a collector terminal coupled to the gate of triac TR701, for example via a resistor R811 and a diode D810. Bipolar transistor TB810 has its base terminal and emitter terminal coupled to its driving circuit. More particularly, a first terminal of resistor R811 is coupled, preferably connected, to the gate of thyristor R811, and a second terminal of resistor R811 is coupled, preferably connected, to the cathode of diode D810. The anode of diode D810 is coupled, preferably connected, to the collector terminal of transistor TB810.

According to an embodiment, the driving circuit of the bipolar transistor TB210 is referenced to the potential of node GND-DC-200. The driving circuit is, also, controlled by a command potential VB TB810 detailed hereafter.

The driving circuit comprises a resistor R812. A first terminal of resistor R812 is coupled, preferably connected, to the base terminal of transistor TB810 and to a node providing the command potential VB TB810, and a second terminal of resistor R812 is coupled, preferably connected, to the emitter terminal of transistor TB810 and to a node providing a positive potential VCC800.

The driving circuit further comprises a capacitor C810. A first terminal of capacitor C810 is coupled, preferably connected, to the emitter terminal of transistor TB810 and to a node providing the positive potential VCC800, and a second terminal of capacitor C810 is coupled, preferably connected, to the node GND-DC-200.

A normal operation of circuit is the following.

When the AC voltage VAC is positive, the diode D201 and D204 can conduct. Transistor TB810 is reverse-biased, meaning the voltage between its emitter terminal and its collector terminal is negative, and a command current is sunk from its base terminal. Thus, transistor TB810 is conductive, and a current is supplied to the gate of thyristor T801.

Thyristor T801 is only turned on during positive half-cycles of the AC voltage. When the AC voltage VAC is negative, the diode D202 and D203 can conduct. Thus, diode D810 is reverse-biased and no current can be provided through transistor TB810

One advantage of using control circuit such as circuit 210 of FIG. 2, circuit 710 of FIG. 7, and/or circuit 810 of FIG. 8 is that there are less complicated options to implement. More particularly, such control circuit may avoid the use of an optocoupler, and or the use of relay. More precisely, such control circuits have the advantage of avoiding acoustic noise and reducing the electronic circuit board size in comparison with the use of a relay. Compared to the use of an opto-coupler as an opto-triac or an opto-transistor, this solution presents a higher reliability as opto-couplers present the issue of reduced Current-Transfer-Ratio with ageing. Moreover, in case an opto-coupler like an opto-transistor is used, the presented circuit avoids the use of the associated floating supply voltage required to supply the opto-transistor detector circuit, and so it reduces the complexity of the circuit and the total number of components.

Figure 9:
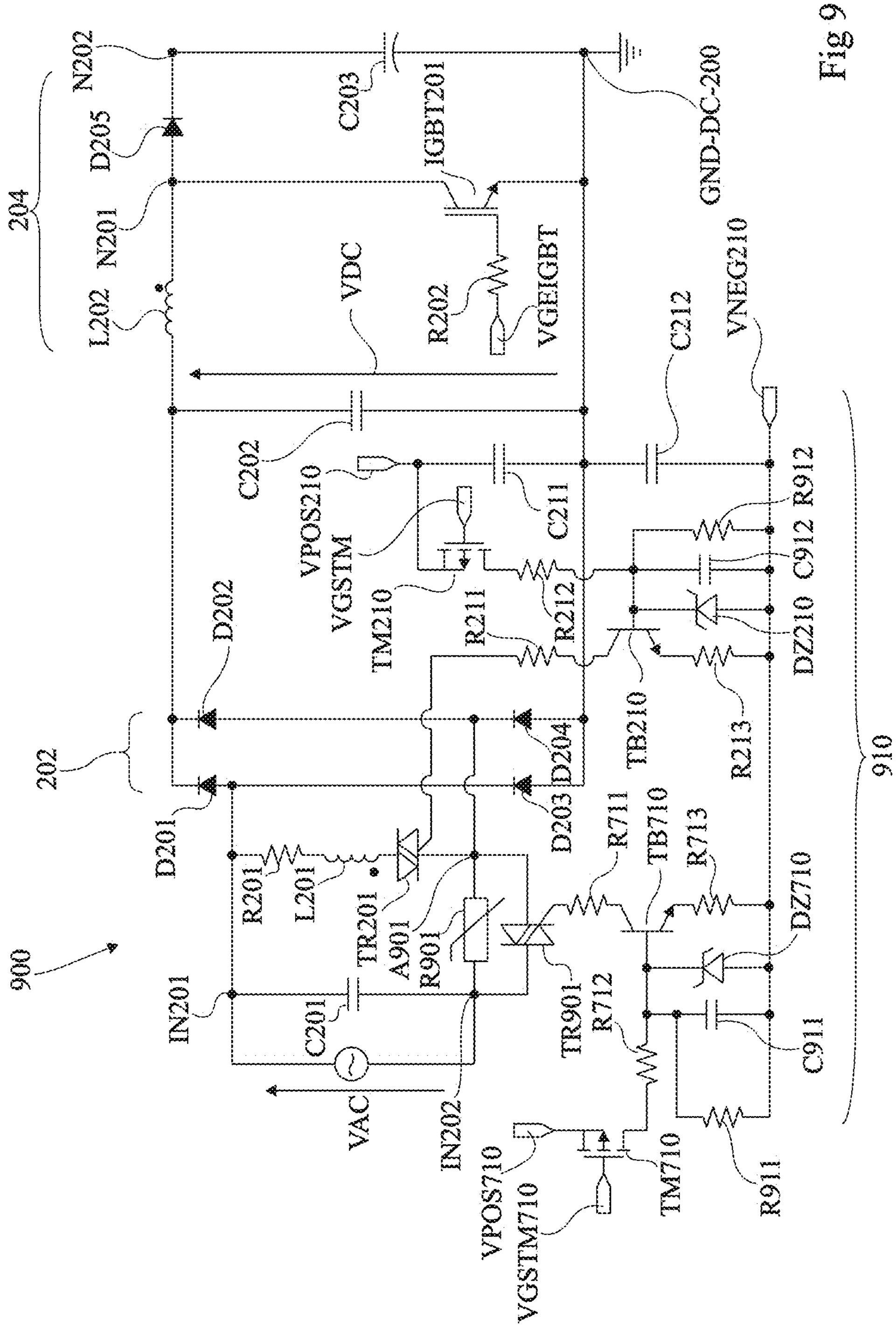
FIG. 9 illustrates a sixth embodiment of a voltage converter circuit of the power supply circuit of FIG. 1, comprising the second embodiment of a control circuit of a triac.

FIG. 9 represents a circuit 900 corresponding to part of an embodiment of a circuit similar to circuit 100 described in relation with FIG. 1.

According to an example, circuit 900 corresponds to part of an embodiment of a power supply circuit, for example of the type of the power supply circuit 100 described in relation with FIG. 1. Circuit 900 comprises the second embodiment of a control circuit of a triac of the type of control circuit TR101-CMD described in relation to FIG. 7. Circuit 900 corresponds to a part of the first conversion stage of the power supply circuit, meaning said converter circuit.

More particularly, circuit 900 is a variant of circuit 700 described in relation with FIG. 7. Common elements of circuits 700 and 900 are not described in detail again here, and only differences between circuits 700 and 900 are emphasized.

Circuit 900 differs from circuit 700 in that thyristor TR701 and variable resistor R701 are replaced by a thyristor TR901 and a variable resistor TR901.

More particularly, a first terminal of variable resistor R901 is coupled, preferably connected, to input node IN202 and a second terminal of variable resistor R901 is coupled, preferably connected, to a node A901. Similarly, a first terminal of triac TR901, opposite to its gate terminal, usually called triac anode or triac anode 2, is coupled, preferably connected, to node A901 and a second terminal triac TR901, also called its driving reference terminal, anode 1 or cathode, near to its gate terminal, is coupled, preferably connected, to input node IN202 and to the second terminal of triac TR201. Node A901 corresponds to the cathode terminal of diode D204 and the anode terminal of diode D202.

Furthermore, similarly to circuit 700, circuit 900 comprises:

triac TR201;

capacitor C201;

voltage rectifier circuit 202;

capacitor C202;

power factor correction 204.

Circuit 900 further comprises a common control circuit 910 for triac TR901 and triac TR701. Control circuit 910 comprises circuit 710 of circuit 700 described in relation with FIG. 7. More particularly, circuit 910 comprises:

bipolar transistor TB210;
resistors R211, R212, R213;
Zener diode DZ210;
MOS transistor TM210;
capacitors C211 and C212;
bipolar transistor TB710;
resistors R711, R712, R713;
Zener diode DZ710; and
MOS transistor TM710.

Control circuit 910 is used to provide a command current to the gate of triac TR201 and to the gate of triac TR901.

Control circuit 910 further, and optionally, comprises a resistor R911 and a capacitor C911 coupled in parallel. A first terminal of the resistor R911 is coupled, preferably connected, to the base terminal of transistor TB710, and a second terminal of resistor R911 is coupled, preferably connected, to the node providing negative potential VNEG210. Similarly, a first terminal of the capacitor C911 is coupled, preferably connected, to the base terminal of transistor TB710, and a second terminal of capacitor C911 is coupled, preferably connected, to the node providing negative potential VNEG210.

Control circuit 910 further, and optionally, comprises a resistor R912 and a capacitor C912 coupled in parallel. A first terminal of the resistor R912 is coupled, preferably connected, to the base terminal of transistor TB710, and a second terminal of resistor R912 is coupled, preferably connected, to the node providing negative potential VNEG210. Similarly, a first terminal of the capacitor C912 is coupled, preferably connected, to the base terminal of transistor TB710, and a second terminal of capacitor C912 is coupled, preferably connected, to the node providing negative potential VNEG210.

Circuit 900 operates in a similar way as circuit 700.

Figure 10:
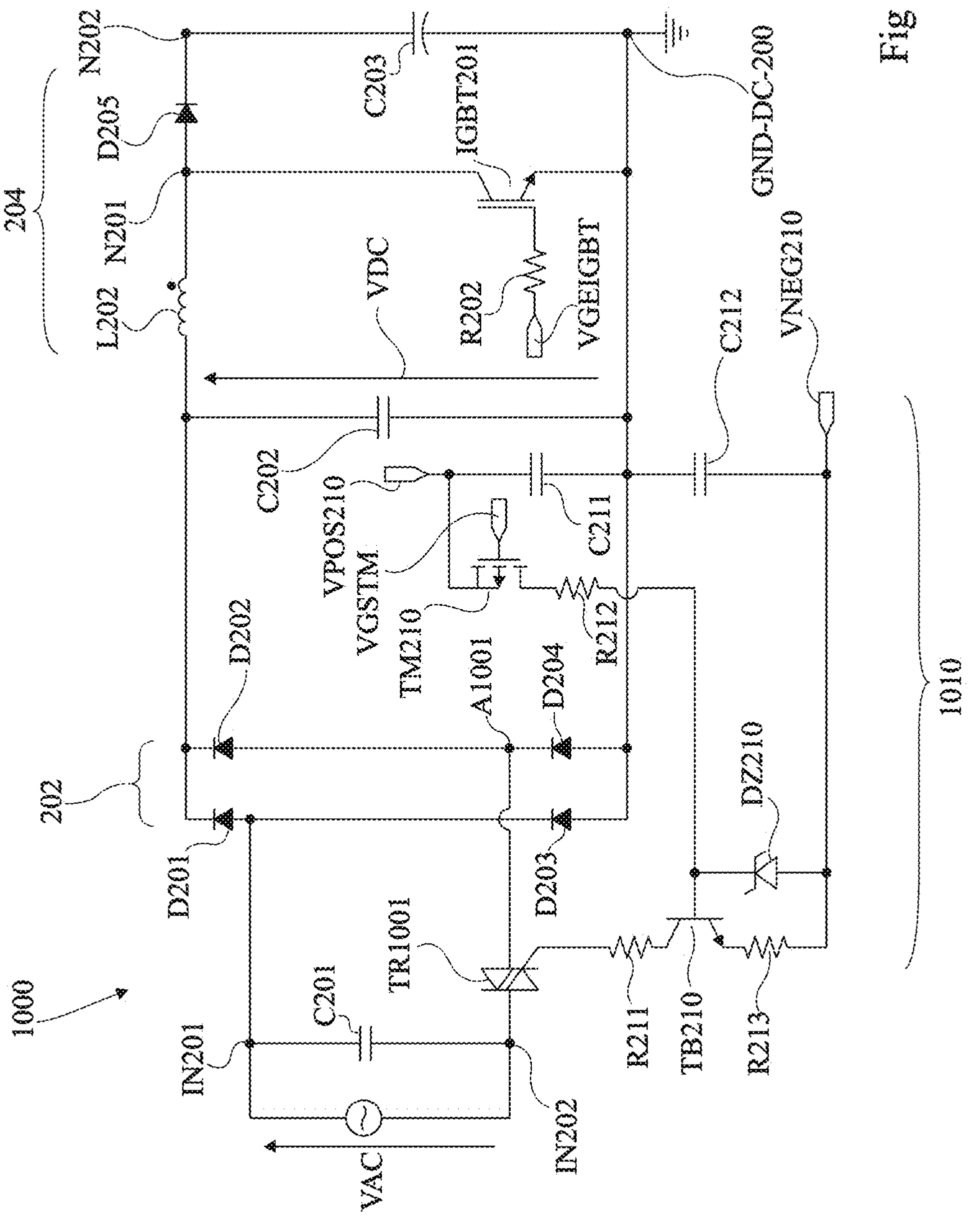
FIG. 10 illustrates a seventh embodiment of a voltage converter circuit of the power supply circuit of FIG. 1, comprising the first embodiment of a control circuit of a triac.

FIG. 10 represents a circuit 1000 corresponding to part of an embodiment of a circuit similar to circuit 100 described in relation with FIG. 1.

According to an embodiment, circuit 1000 corresponds to part of an embodiment of a power supply circuit, for example of the type of the power supply circuit 100 described in relation with FIG. 1. Circuit 1000 comprises the second embodiment of a control circuit of a triac of the type of control circuit TR101-CMD described in relation to FIG. 7. Circuit 1000 corresponds to a part of the first conversion stage of the power supply circuit, meaning said converter circuit.

More particularly, circuit 1000 is a variant of circuit 700 described in relation with FIG. 7. Common elements of circuits 700 and 1000 are not described in detail again here, and only differences between circuits 700 and 1000 are emphasized.

Circuit 1000 differs from circuit 700 in that resistor R701 have been removed, and triac TR701 is replaced by a triac TR1001. Triac TR1001 is coupled in the same way as triac TR701.

Furthermore, similarly to circuit 700, circuit 1000 comprises:

capacitor C201;
voltage rectifier circuit 202;
capacitor C202;
power factor correction 204; and
the control circuit 210.

Control circuit 210 is used to provide a command current to the gate terminal of triac TR1001.

Circuit 1000 operates in a similar way as circuit 700.

Figure 11:
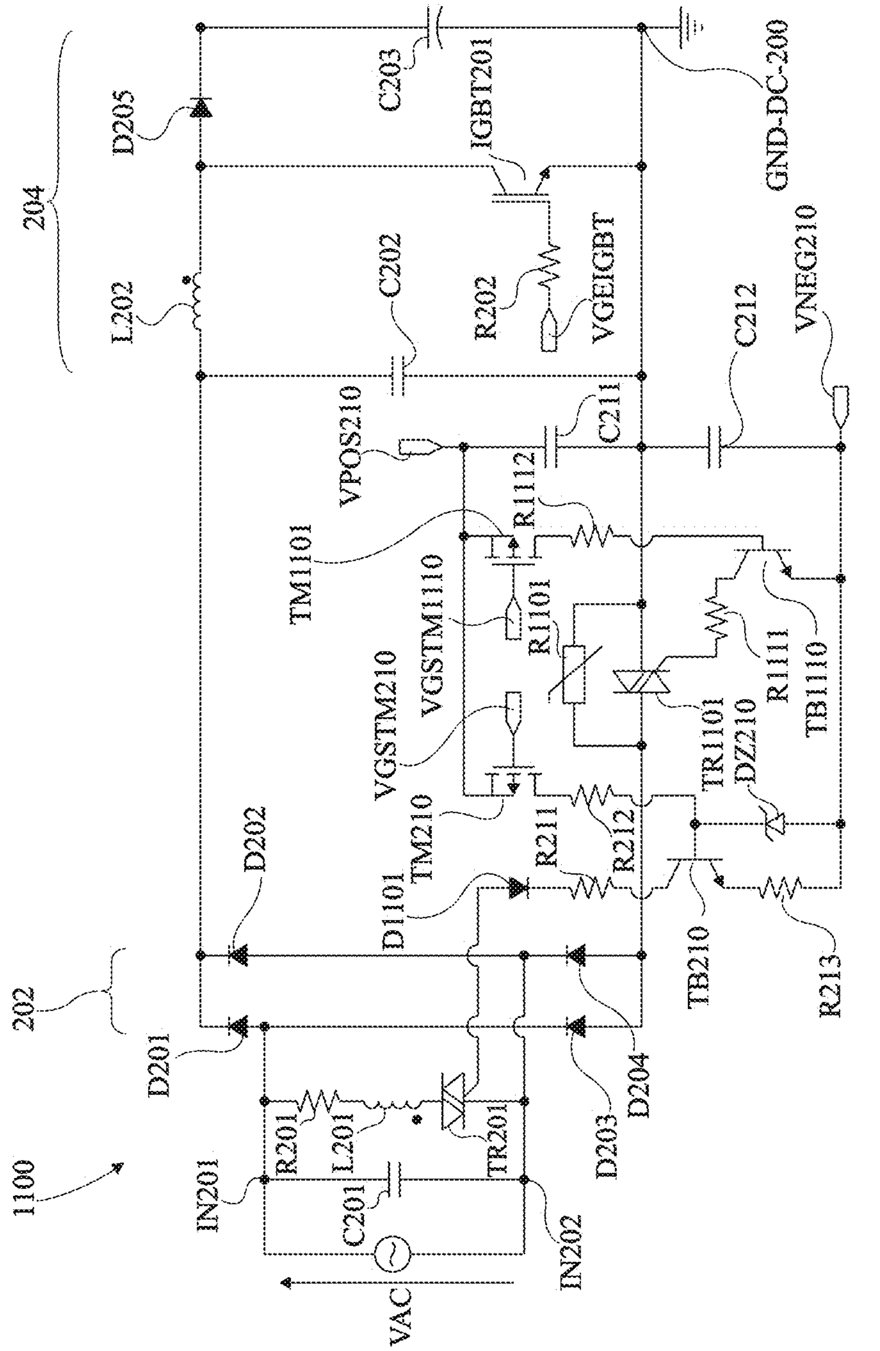
FIG. 11 illustrates an eighth embodiment of a voltage converter circuit of the power supply circuit of FIG. 1, comprising the second embodiment of a control circuit of a triac.

FIG. 11 represents a circuit 1100 corresponding to part of an embodiment of a circuit similar to circuit 100 described in relation with FIG. 1.

According to an example, circuit 1100 corresponds to part of an embodiment of a power supply circuit, of the type of the power supply circuit 100 described in relation with FIG. 1. Circuit 1100 comprising a first embodiment of a control circuit of a triac of the type of control circuit TR101-CMD described in relation to FIG. 1. Circuit 1100 corresponds to a part of the first conversion stage of the power supply circuit, meaning said converter circuit.

More particularly, circuit 1100 is a variant of circuit 700 described in relation with FIG. 7. Common elements of circuits 700 and 1100 are not described in detail again here, and only differences between circuits 700 and 1100 are emphasized.

More precisely, similarly to circuit 700, circuit 1100 comprises:

triac TR201;
capacitor C201;
voltage rectifier circuit 202;
capacitor C202; and
power factor correction 204.

Circuit 1100 differs from circuit 700 in that resistor R701 and triac TR701 are replaced by a a resistor R1101 triac TR1101. Triac TR1001 and resistor R1101 are coupled in parallel, and this parallel association is connected in series between node GND-DC-200 and the voltage rectifier circuit 202. More particularly, a first terminal of the triac TR1101 opposite its gate terminal of the triac TR1101 is coupled, preferably connected, to the anode of diodes D203 and D204. A second terminal of the triac TR1101, referenced to its gate terminal, is coupled, preferably connected, to the node GND-DC-200.

Circuit 1100 further comprises a common control circuit 1110 for triac TR201 and triac TR1101. Control circuit 1110 comprises circuit 210 of circuit 200 described in relation with FIG. 2. More particularly, circuit 1110 comprises:

bipolar transistor TB210;
resistors R211, R212, R213;
Zener diode DZ210;
MOS transistor TM210; and
capacitors C211 and C212.

These electronical components are used to provide a command current to triac TR201.

Control circuit 1110 further comprises a bipolar transistor TB1110 and its driving circuit. According to an example, bipolar transistor TB110 is of NPN type. According to an example, bipolar transistor TB1110 is a low voltage transistor.

Bipolar transistor TB1110 comprises a collector terminal coupled to the gate of triac TR1101, for example via a resistor R1111. Bipolar transistor TB1110 has its base terminal and emitter terminal coupled to its driving circuit. According to a variant, transistor TB1110 can be replaced by a low voltage MOS transistor.

According to an embodiment, the driving circuit of the bipolar transistor TB1110 is referenced to the potential of node GND-DC-200 via capacitor C212. The driving circuit is, also, controlled by a command potential VGSTM1110.

The driving circuit comprises a resistor R1112 and a MOS transistor TM1110. According to an example MOS transistor TM1110 is of P-type. A first terminal of resistor R1112 is coupled, preferably connected, to the base terminal of transistor TB1110, and a second terminal of resistor R1112 is coupled, preferably connected, to a drain terminal of transistor TM1110. A source terminal of transistor TM210 is coupled, preferably connected, to a node providing positive potential VPOS210. A source terminal of transistor TM1110 is coupled, preferably connected, to a node providing the command potential VGSTM1110. For example, potentials VGSTM1110 and VPOS210 are supplied by a processor, or microprocessor, of the type of processor 102 described in relation to FIG. 1.

According to an embodiment, circuit 1100 further comprises a diode D1101 disposed between the gate node of triac TR201 and control circuit 1110. More particularly, an anode of diode D1101 is coupled, preferably connected, to the gate node of triac TR201, and a cathode of diode D1101 is coupled, preferably connected, to conducting node of resistor R211.

Diode D1101 has the advantage of allowing the placement of triac TR1101. Diode D1101 is required to avoid unwanted current flowing to the gate node of triac TR201 when Triac TR1101 is holding a negative voltage.

Circuit 1100 operates in a similar way as circuit 700.

Various embodiments and variants have been described. Those skilled in the art will understand that certain features of these embodiments can be combined and other variants will readily occur to those skilled in the art.

As an example, one of the triacs of the circuit 700 described in relation with FIG. 7, or the circuit 900 described in relation with FIG. 9 can be replaced by a thyristor. The person skilled in the art is able to adapt the driving circuit of the triac and the thyristor accordingly.

Furthermore, other types of voltage rectifier circuit can be considered to replace circuit 202 in the embodiment of FIGS. 7 and 8, such as the ones described in relation with FIGS. 5 and 6.

Furthermore, circuit 100 is described to be, as an example, a voltage, but other application of circuit 100 are obvious for the person skilled in the art.

Finally, the practical implementation of the embodiments and variants described herein is within the capabilities of those skilled in the art based on the functional description provided hereinabove.

The invention claimed is:

1. A voltage converter circuit comprising:

a first input of the voltage converter circuit;

a second input of the voltage converter circuit;

a first output of the voltage converter circuit;

a second output of the voltage converter circuit;

wherein the first input of the voltage converter circuit and the second input of the voltage converter circuit are configured to receive an AC voltage;

a voltage rectifier assembly comprising at least one semiconductor device connected between the second input of the voltage converter circuit and the second output of the voltage converter circuit;

at least a triac or a thyristor comprising a driving reference terminal, wherein the driving reference terminal is connected to connected with the at least one semiconductor device of the voltage rectifier assembly at the second input of the voltage converter circuit;

at least one control circuit of the triac or thyristor comprising:

a first transistor; and a driving circuit of the first transistor referenced to the second output of the voltage converter circuit.

2. The voltage converter circuit of claim 1, wherein when the at least one control circuit is a triac control circuit, and the first transistor is a bipolar transistor of a NPN type.

3. The voltage converter circuit of claim 2, wherein when the at least one control circuit is a thyristor control circuit, and the first transistor is a bipolar transistor of a PNP type.

4. The voltage converter circuit of claim 1, wherein the at least one semiconductor device is a first diode whose anode is connected to the second output of the voltage converter circuit.

5. The voltage converter circuit of claim 1, wherein the at least one semiconductor device is a MOS type transistor.

6. The voltage converter circuit of claim 1, wherein the at least one semiconductor device is an assembly comprising an IGBT type transistor connected in antiparallel with a diode or a second reverse-conducting IGBT type transistor.

7. The voltage converter circuit of claim 1, wherein, when the at least one control circuit is a triac control circuit, the driving circuit comprises a Zener-type diode coupling a base of the first transistor to a first conduction terminal of the first transistor.

8. The voltage converter circuit of claim 1, wherein the at least one control circuit is a control circuit of at least two triacs or one thyristor and at least one triac.

9. The voltage converter circuit of claim 1, wherein the at least one control circuit is configured to be controlled by a processor.

10. The voltage converter circuit of claim 1, wherein the voltage rectifier assembly comprises a first input node and a second reference input node, between which an AC voltage is applied.

11. The voltage converter circuit of claim 1 further comprising a power factor correction circuit.

12. The voltage converter circuit of claim 1, wherein the first transistor is a bipolar transistor, and wherein a diode is coupled in series between a gate of the triac or the thyristor and a collector of the first transistor of the at least one control circuit of the triac or thyristor.

13. The voltage converter circuit of claim 10, wherein the AC voltage is a three phases AC voltage.

14. A supply circuit of a motor supplying a three-phase voltage comprising the voltage converter circuit of claim 1.

15. The supply circuit of claim 14 further comprising a processor configured to drive the at least one control circuit.

* * * * *